(No Model.)
K. SEIFERT.
MACHINE FOR DEGRANULATING CHEESE CURD.
No. 346,227. Patented July 27, 1886.
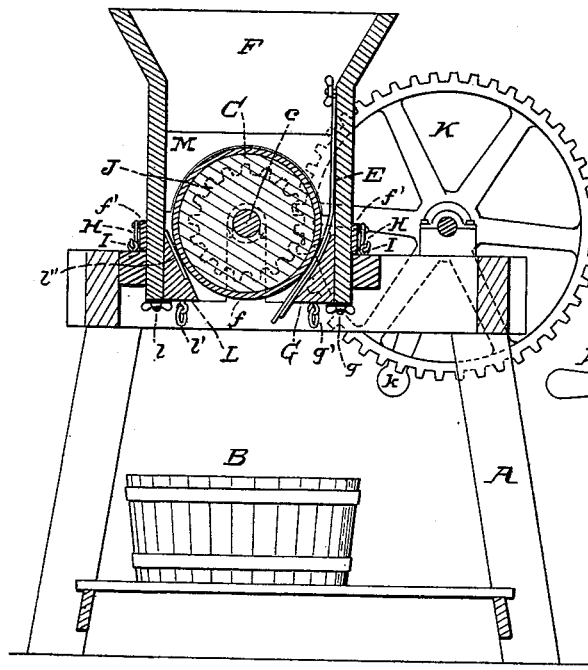
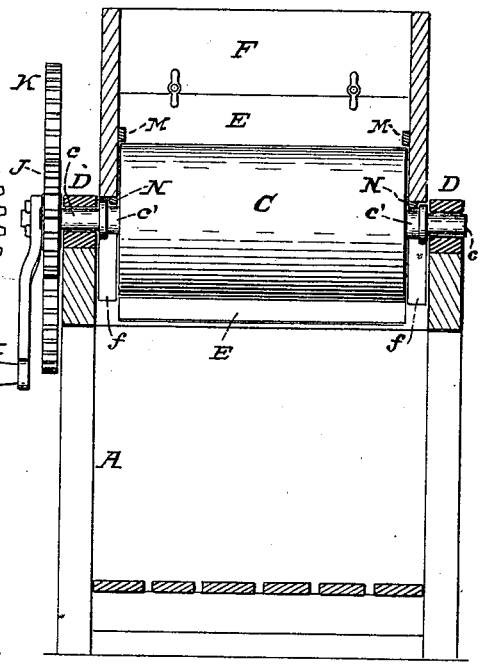
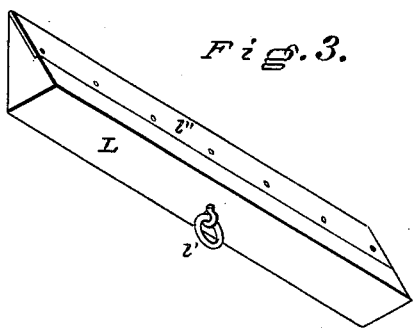
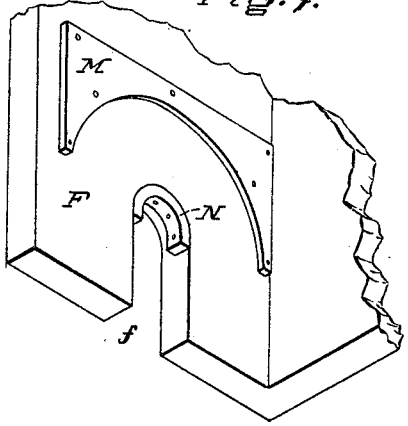
Attest:
A. P. Knight
F. A. Hopkins
Inventor:
Katharina Seifert
By Knight Bros.
Attys.

UNITED STATES PATENT OFFICE.

KATHARINA SEIFERT, OF CINCINNATI, OHIO.

MACHINE FOR DEGRANULATING CHEESE-CURD.

SPECIFICATION forming part of Letters Patent No. 346,227, dated July 27, 1886.

Application filed March 8, 1886. Serial No. 194,468. (No model.)

*To all whom it may concern:*

Be it known that I, KATHARINA SEIFERT, of Cincinnati, Hamilton county, Ohio, have invented new and useful Improvements in Machines for Degranulating Cheese - Curd, of which the following is a specification.

My invention relates to improvements in the machine for degranulating and working schmierkase which was shown and described in Patent No. 290,485, granted to me December 18, 1883, to which reference may be made for a more complete explanation of the operation and advantages of the machine than is here given. In the said machine there is a hopper containing two rollers, which roll upwardly on each other and rub downwardly against brakes attached to the hopper-sides, so that the mixture of curds and whey which is poured into the hopper is carried outward and downward to the brakes, where the curds are triturated or ground and intimately incorporated with the whey, forming a paste or batter, which falls into a receptacle beneath the hopper. The ends of the hopper are provided with linings closely fitting the peripheries of the rollers, so as to obstruct the passage of whey downward at the roller ends. Notwithstanding this precaution, however, a considerable portion of the curds and whey passes in this manner, and, seeping through the axle-receiving orifices of the hopper, is wasted.

My improvements are directed partly toward preventing such leakage through the hopper ends and partly toward rendering possible the use of one roller instead of two, so as to provide a simpler machine adapted to work with a smaller amount of schmierkase, but requiring less power.

In the accompanying drawings, Figure 1 is a vertical section in the plane of rotation of the roller of a schmierkase-degranulating machine embodying my invention. Fig. 2 is a vertical section of the same, taken axially with respect to the roller. Fig. 3 represents in perspective one of the wedges hereinafter referred to. Fig. 4 is a perspective view of a portion of the hopper end, showing the packing half-ring, which, occupying a corresponding groove in the axle, prevents leakage of curds and whey along the same.

A is an open frame, adapted to hold a receptacle, B, and to support the degranulating mechanism proper, which consists of a roller, C, mounted in bearings D, and of a sheet-metal brake, E, attached to one side of the hopper F, and pressed against the roller C by a wedge, G, which is inserted between the brake and the hopper side, and is held in place by a button, *g*. Slots *f* in the hopper ends receive the roller-axle *c* and enable the hopper to be let down into its proper position, when by its battens *f'* it rests upon the frame, and is held down on the same by hooks H, that engage in eyes or staples I.

The roller C may be driven by any suitable means. For example, its axle *c* may carry a pinion, J, engaging with a spur-wheel, K, turned by means of a crank, *k*, in such a direction as to cause the side of the roller which is against the brake to move downward. Between the other or ascending side of the roller and the corresponding hopper side is inserted a wedge, L, which is held in place by a button, *l*, and presses against the roller, so as, on the one hand, to prevent downflow of the curds and whey which are poured into the hopper, and on the other hand to scrape off and drop into the receptacle B that portion of the triturated schmierkase which clings to the roller C. Rings *l'* and *g'* on the wedges L and G respectively enable them to be more conveniently handled. The bearing portion of the wedge L is preferably lined, as at *l''*, with tin, leather, or other suitable material, to enable it to resist erosion by the roller C.

A lining, M, preferably of leather, is attached to each end of the hopper, and closely fits the periphery of the roller, so as to obstruct passage of curds and whey downward between the ends of the roller and hopper. Such material as does pass in this manner is effectually barred from running out along the axle *c* by a packing half ring, N, secured in the upper end of the slot *f* and fitting into a corresponding groove, *c'*, in the axle. If not thus prevented from leaking along the axle to the bearings D and the frame, a considerable portion of the curds and whey would be wasted in this manner, and would soon rust and injure the bearings, and by destructive fermentation and putrefaction contaminate the schmierkase. The packing-piece N is preferably of leather. Of course this packing device is equally applicable to the two-roller form of schmierkase-working machine set forth in the patent above referred to.

Instead of employing a leather half-ring, the slot $f$ may be cut so as to leave a flange of that shape, which will serve the same purpose, though less perfectly.

I claim as new and of my invention—

1. In a schmierkase-degranulating machine, the combination of the axle $c$, having grooves $c'$, hopper F, having in its ends slots $f$, for receiving the axle $c$, and half-ring flanges N, projecting inward from the top of said slots $f$, and fitting into the grooves $c'$, substantially as and for the purpose set forth.

2. In a schmierkase-degranulating machine, the combination of a triturating-roller, C, a brake, E, pressing against one side of said roller, and a wedge, L, pressing against the other side of the same, substantially as and for the purposes set forth.

In testimony of which invention I hereunto set my hand.

KATHARINA SEIFERT.

Attest:
A. P. KNIGHT,
E. M. WILLIAMS.